UNITED STATES PATENT OFFICE.

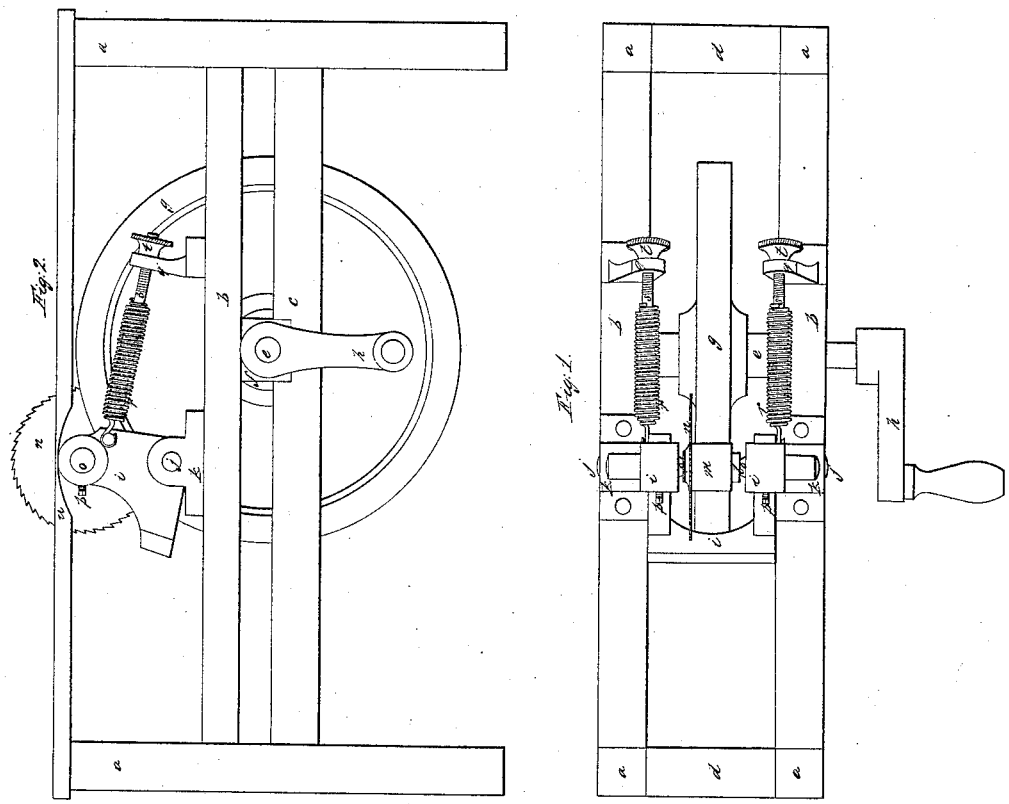

JOSEPH HARRIS, JR., OF BOSTON, MASSACHUSETTS.

IMPROVEMENT IN DRIVING CIRCULAR SAWS.

Specification forming part of Letters Patent No. 10,108, dated October 11, 1853.

*To all whom it may concern:*

Be it known that I, JOSEPH HARRIS, Jr., of Boston, in the county of Suffolk and State of Massachusetts, have invented a new and useful Improvement on a Machine for Driving Circular Saws and other Cutters; and I do hereby declare that the following is a full and exact description thereof, reference being had to the accompanying drawings, and to the letters of reference marked thereon, in which—

Figure 1 is a plan, and Fig. 2 is a side elevation.

The same letters refer to like parts in both figures.

The nature of my invention consists in hanging the arbor, with a pulley and saw thereon, in a frame, the axis of the arbor-frame being parallel to the axis of the large driving-pulley and within its circumference, with springs attached to the said frame, the tendency of which is to swing the arbor-frame in such a manner as to bring the surfaces of the pulleys together, and a few pounds applied by the springs will cause many pounds pressure on the surfaces of the pulleys. When used to drive a circular saw, the angle on which the arbor-frame is hung is such that the faster the stuff is fed to the saw the stronger the saw will run; or, in other words, the friction or driving power on the surface of the arbor-pulley is increased in proportion to the amount of labor the saw has to do.

This invention is designed more particularly for a portable machine to drive circular saws and cutters of different kinds, to be used by carpenters and others; but it may be used with advantage for other purposes.

To enable others skilled in the art to make and use my invention, I will proceed to describe its construction and operation.

I construct a frame with posts $a$ and girts $b$, $c$, and $d$, or in any of the usual forms. Near the center of this frame I place a shaft $e$, extending crosswise of the frame, with journals at or near each end fitted to revolve in boxes $f$, secured to the lower girts $c$. On the center of this shaft, between the journals, there is a large driving-pulley $g$, the periphery of which is a broad flat surface, and on one end of the said shaft, outside of the frame, there is a crank $h$, to which the power is applied. I then construct an arbor-frame $i$, and place it over or in front of the driving-pulley. This arbor-frame has an ear extending down each side of the driving-pulley, with a journal $j$ for its axis projecting from the side of the lower extremity of each ear. The arbor-frame is then hung to the upper girts $b$ by boxes $k$, secured to the said girts and fitted to the journals $j$, bringing the axes of the said arbor-frame, on which it is made to swing, within the circumference of the driving-pulley. I then make an arbor $l$, with a flat-surfaced pulley $m$ on its center, and attach a circular saw $n$ to one end of the pulley. This arbor has a female center at each end fitted to revolve on male centers $o$, set in the upper part of the arbor-frame, the male centers being secured in their proper position by set-screws $p$. The axes of the arbor and the axes of the arbor-frame are parallel to each other and both parallel to the axes of the driving-pulley, and so situated that the periphery of the arbor-pulley comes in direct contact with the periphery of the driving-pulley.

A little back of the axes of the driving-pulley I place a stand $q$ on each of the upper girts. I then attach a spiral spring $r$ or its equivalent to each end of the arbor-frame, with a screw $s$ attached to the back end of the spring. The said screw passes through an orifice in the stand $q$, with a thumb-nut $t$ on the extreme end, which screws up against the stand for the purpose of regulating the power of the spring and giving the arbor-pulley the required pressure on the periphery of the driving-pulley to prevent it from slipping. Over the arbor-frame a table $u$ is placed, in the usual form, permitting the upper section of the saw to pass up through it to lay the stuff upon to be sawed.

One great advantage that this machine has over others is that the arbor-frame is hung on journals each side of the driving-pulley and at such an angle with a tangent to the driving-pulley that the act of feeding the stuff to the saw or cutter presses the arbor-pulley harder against the driving-pulley. By turning the crank the driving-pulley is set in motion, and as the periphery of the arbor-pulley comes in contact with the periphery of the driving-pulley the saw or cutter is made to revolve at a speed in proportion to the difference between the diameters of the arbor-pulley and driving-pulley.

Having thus fully described my improvement, I wish it to be understood that I no not claim driving-pulleys by their surfaces coming in contact with each other, that method having before been used; but

What I claim therein as new, and for which I desire to secure Letters Patent, is—

1. The method of hanging the arbor-frame on journals for its axis, each side of the driving-pulley bringing the axes of the arbor-frame within the circumference of the driving-pulley or on a line passing through the driving-pulley in such a manner and at such an angle with a tangent to the driving-pulley that the act of feeding the stuff to the saw or cutter will press the arbor-pulley against the driving-pulley, in the manner and for the purpose herein described.

2. Hanging the arbor-frame on such an angle that the act of feeding the stuff to the cutter will press the arbor-pulley against the driving-pulley, in combination with a spiral spring or its equivalent for holding the arbor-pulley firmly against the driving-pulley, as herein described.

JOSEPH HARRIS, Jr.

Witnesses:
 MICAH DYER, Jr.,
 GEO. D. PHILLIPS.